(12) United States Patent
Boivin et al.

(10) Patent No.: US 7,748,772 B2
(45) Date of Patent: Jul. 6, 2010

(54) RESILIENT AERODYNAMIC TRAILER SKIRTS

(75) Inventors: Mathieu Boivin, Montreal (CA);
Philippe Desjardins, Montréal (CA);
Mathieu Desjardins, Montréal (CA)

(73) Assignee: Transtex Composites Inc., Montréal, Québec (CA)

( * ) Notice: Subject to any disclaimer, the term of this patent is extended or adjusted under 35 U.S.C. 154(b) by 0 days.

(21) Appl. No.: 12/436,970

(22) Filed: May 7, 2009

(65) Prior Publication Data

US 2009/0218848 A1    Sep. 3, 2009

Related U.S. Application Data

(62) Division of application No. 12/360,038, filed on Jan. 26, 2009.

(51) Int. Cl.
*B62D 35/02* (2006.01)

(52) U.S. Cl. .................... 296/180.4; 180/903

(58) Field of Classification Search ............. 105/1.1, 105/1.2, 1.3; 180/903; 248/628, 632; 296/180.1, 296/180.4

See application file for complete search history.

(56) References Cited

U.S. PATENT DOCUMENTS

| | | | | | |
|---|---|---|---|---|---|
| 1,846,269 | A * | 2/1932 | Musselman | ............... | 156/130 |
| 2,318,863 | A * | 5/1943 | Jabelmann | ............... | 105/1.2 |
| 2,546,268 | A * | 3/1951 | Legris | .............. | 248/626 |
| 2,605,119 | A * | 7/1952 | Earnest | .............. | 280/849 |
| 3,711,146 | A * | 1/1973 | Madzsar et al. | ......... | 296/180.2 |
| 4,119,339 | A * | 10/1978 | Heimburger | ............. | 296/180.5 |
| 4,386,801 | A * | 6/1983 | Chapman et al. | ........... | 280/107 |
| 4,585,262 | A * | 4/1986 | Parks | .................. | 296/180.1 |
| 4,611,847 | A * | 9/1986 | Sullivan | ............... | 296/180.2 |
| 4,616,869 | A * | 10/1986 | Sacco et al. | ............. | 296/180.1 |
| 4,640,541 | A * | 2/1987 | FitzGerald et al. | ...... | 296/180.1 |
| 4,746,160 | A * | 5/1988 | Wiesemeyer | ........... | 296/180.2 |
| 5,094,503 | A * | 3/1992 | Dare-Bryan | ............ | 296/180.1 |
| 5,358,210 | A * | 10/1994 | Simon et al. | ............. | 248/628 |
| 5,536,062 | A * | 7/1996 | Spears | .................. | 296/180.3 |
| 6,017,013 | A * | 1/2000 | Simonian | ................ | 248/632 |
| 6,644,720 | B2 * | 11/2003 | Long et al. | ............. | 296/180.4 |
| 6,742,616 | B2 * | 6/2004 | Leban | ................ | 180/116 |
| 6,932,419 | B1 * | 8/2005 | McCullough | .......... | 296/180.1 |
| 7,147,270 | B1 * | 12/2006 | Andrus et al. | ........... | 296/180.5 |
| 7,163,258 | B2 * | 1/2007 | Dyer et al. | ............. | 296/191 |
| 7,216,923 | B2 * | 5/2007 | Wong et al. | ............ | 296/180.2 |
| 7,497,502 | B2 * | 3/2009 | Wood | .................. | 296/180.4 |
| 7,578,541 | B2 * | 8/2009 | Layfield et al. | .......... | 296/180.2 |
| 7,604,284 | B2 * | 10/2009 | Reiman et al. | .......... | 296/180.4 |
| 2003/0234555 | A1 * | 12/2003 | Hojna | ................ | 296/180.1 |
| 2004/0155485 | A1 * | 8/2004 | Hamnett | ............... | 296/180.1 |
| 2007/0257512 | A1 * | 11/2007 | Anderson | ............. | 296/180.1 |

(Continued)

FOREIGN PATENT DOCUMENTS

JP    60012378 A  *  1/1985

*Primary Examiner*—Glenn Dayoan
*Assistant Examiner*—Paul A Chenevert

(57) ABSTRACT

A resilient aerodynamic skirt assembly is provided, the aerodynamic skirt assembly comprising a skirt panel adapted to connect to a trailer to route airflow along the trailer, skirt supports adapted to connect the skirt to a trailer are also provided with a plurality of resilient struts providing lateral support to the skirt panel, the resilient struts allowing substantial lateral deflection of the skirt panel away from an aerodynamic configuration. A method of assembling an aerodynamic skirt assembly and an aerodynamic skirt kit are also provided.

18 Claims, 12 Drawing Sheets

U.S. PATENT DOCUMENTS

| | | | |
|---|---|---|---|
| 2008/0238139 A1* | 10/2008 | Cardolle | 296/180.4 |
| 2008/0303309 A1* | 12/2008 | Dayton | 296/180.1 |
| 2008/0303311 A1* | 12/2008 | Roush | 296/180.4 |
| 2009/0146453 A1* | 6/2009 | Ortega et al. | 296/180.4 |
| 2009/0195017 A1* | 8/2009 | Wood | 296/180.4 |
| 2009/0212595 A1* | 8/2009 | Heppel et al. | 296/180.4 |
| 2010/0066123 A1* | 3/2010 | Ortega et al. | 296/180.4 |

* cited by examiner

RESILIENT AERODYNAMIC TRAILER SKIRTS

CROSS-REFERENCE

The present application relates to and is a divisional application of U.S. patent application Ser. No. 12/360,038, filed Jan. 26, 2009, entitled AERODYNAMIC TRAILER SKIRTS, that claims priority from U.S. Provisional Patent application No. 61/024,217, filed Jan. 29, 2008, entitled AERODYNAMIC TRAILER SKIRT.

FIELD OF THE INVENTION

This invention relates to aerodynamic trailer skirts, and also relates to a resilient skirt and attachment mechanism thereof.

BACKGROUND OF THE INVENTION

Road tractors are used to pull road trailers on roads to transport cargo. Aerodynamic apparatuses are installed on the road tractor and/or on the road trailer in order to reduce the aerodynamic air drag and improve fuel efficiency.

Trailer skirts made of rigid materials are installed on both sides of a road trailer to help manage the flow of air around and underneath the trailer. Brackets, also made of rigid material, are affixed to the trailer to secure the skirts positioned thereto. These skirts are secured to the bottom portion of the trailer, or on the sides of the trailer's floor, to ensure proper positioning when the vehicle is moving.

People who are familiar with the trucking industry know that trailers are subject to hazardous road conditions. The skirts, because of their position under the trailer's floor and their proximity with the road, are significantly vulnerable and might easily enter in contact with surrounding obstacles. The brackets holding the skirts, when put under significant stress, plastically bend and/or break to effect the skirts' position in respect to the road trailer thus reducing the efficiency of the skirts. Moreover, the skirt itself might bend and/or break if they contact a foreign object. This also increases the operation cost and the maintenance time that is required.

The shape of the skirts, and their respective positions on the road trailer, have a significant effect on the aerodynamics efficiency of the road trailer.

Therefore, there exists a need in the art for an improved aerodynamic skirt assembly over the existing art. There is a need in the art for such a resilient skirt assembly that can be easily installed and economically manufactured.

SUMMARY OF THE INVENTION

It is one aspect of the present invention to alleviate one or more of the drawbacks of the background art by addressing one or more of the existing needs in the art.

Accordingly, one object of one or more embodiments of this invention provides an improved trailer skirt over the prior art.

An object of the invention provides a skirt assembly adapted to be installed on a road trailer to reduce the aerodynamic drag produced by the movement of the road trailer when pulled by a road tractor. The skirt assembly comprising a skirt panel sized and designed to channel air along the trailer. The skirt assembly, once installed on the road trailer, being substantially vertically disposed under the road trailer between the road trailer wheels and the trailer supports (and could even be extended in front of the trailer supports) with a curved shape defined from the front of the skirt panel to a distance of about between 1.5 meter to 3.5 meters.

One object of the invention provides a resilient skirt assembly that is adapted to bend when it contacts a foreign object and recovers its original position and shape thereafter.

One other object of the invention provides a resilient skirt assembly that can be easily installed and economically manufactured.

Another object of the invention provides a skirt panel adapted to be installed on a road trailer with a rear edge disposed next to the forwardmost road trailer rear wheel to keep a gap therebetween to a minimum. The skirt panel being adapted to forwardly extend next to the road trailer support Another aspect of one or more embodiments of the invention provides a skirt assembly made of composite materials offering a significant range of elastic deformation.

Another aspect of one or more embodiments of the invention provides a resilient strut adapted to secure a skirt panel to a road trailer, the strut being made of a resilient material adapted to sustain significant deformation and adapted to resiliently regain its original position.

Another aspect of one or more embodiments of the invention provides strut supports made of non-metallic material.

One other aspect of one or more embodiments of the invention provides a trailer skirt that is sized and designed to allow a temporary deflection of, inter alia, a bottom portion of the skirt panel.

A further aspect of one or more embodiments of the invention provides a fastening system for easily securing the skirt panel to the trailer; the fastening system uses a limited number of parts to reduce the assembly time and the weight added to the trailer.

A further aspect of one or more embodiments of the invention provides a skirt assembly comprising a plurality of support angles adapted to secure the skirt panel to the road trailer.

According to a further aspect of one or more of these embodiments, support angles made of composite material is provided.

According to an aspect of the present invention provides a resilient strut shaped in one piece.

According to another aspect of the present invention is provided a resilient strut made of composite materials.

Another aspect of the present invention provides a resilient strut having a constant section.

A further aspect of one or more embodiments provides a resilient strut adapted to be connected to the skirt panel at an angle.

One additional aspect of the present invention provides an opening in the skirt panel adapted to allow access to a fuel tank located underneath the road trailer, the opening being adapted to be optionally provided with a door.

Another additional aspect of the present invention provides a skirt panel composed of a plurality of skirt panel modules, at least one panel module being adapted to be removed or pivoted about a hinged mechanism to allow access under the road trailer.

Another aspect of the present invention provides a substantially progressive curvature on the forward portion of the skirt panel.

Another aspect of the invention provides a method of installing a skirt assembly on a road trailer comprising installing fastening a portion of a skirt panel substantially on the edge of a road trailer floor and securing a forwardmost portion of the skirt panel at a predetermined position on the trailer to define the shape of the skirt panel.

Another aspect of the invention provides a radius on the skirt panel adapted to mate the shape of the road trailer wheel to reduce the air gap therebetween.

One another aspect of the invention provides a skirt panel extension adapted to selectively reduce the gap between the road trailer wheels and the skirt panel when the road trailer wheels, disposed on a moveable trailer buggy, are longitudinally moved about the road trailer to change the load distribution of the road trailer.

Another aspect of the present invention provides an aerodynamic skirt adapted to be mounted to a trailer, the aerodynamic skirt comprising a skirt panel defining a front portion and a rear portion, the front portion being adapted to be proximally mounted toward a center of the trailer, the rear portion being adapted to be substantially longitudinally mounted to the trailer.

One other aspect of the present invention provides a method of installing a skirt assembly on a trailer, the method comprising securing upper supports to the trailer, securing a skirt panel to the upper supports, and securing struts between the trailer and the skirt panel.

An aspect of the present invention provides a skirt assembly kit comprising a skirt panel adapted to be disposed on a trailer to route air about the road trailer, a plurality of upper supports adapted to secure the skirt panel to the road trailer and a plurality of struts adapted to secure the skirt panel to the road trailer.

One additional aspect of the invention provides a resilient aerodynamic skirt adapted to be substantially longitudinally mounted to a trailer, the resilient aerodynamic skirt comprising a skirt panel defining a front portion and a rear portion, the front portion being adapted to be mounted toward a forward portion of the trailer and the rear portion being adapted to be mounted toward a rear portion of the trailer in an aerodynamic configuration, the skirt panel being adapted to bend away from the aerodynamic configuration when contacting a foreign object and to recover its aerodynamic configuration thereafter.

Another aspect of the present invention provides a method of installing a resilient skirt assembly on a trailer, the method comprising securing a skirt panel to the trailer; and securing at least one resilient strut between the trailer and the skirt panel, the at least one resilient strut maintaining the skirt panel in an aerodynamic configuration, the at least one resilient strut allowing the skirt panel to bend away from the aerodynamic configuration when contacting a foreign object and to recover its aerodynamic configuration thereafter.

A further aspect of the present invention provides a resilient skirt assembly kit comprising a skirt panel adapted to be disposed on a trailer to aerodynamically route air along the trailer; and a plurality of resilient struts adapted to secure the skirt panel to the trailer.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure.

DETAILED DESCRIPTION OF PREFERRED EMBODIMENTS

A preferred embodiment of the present invention is described bellow with reference to the drawings.

Figure 1:
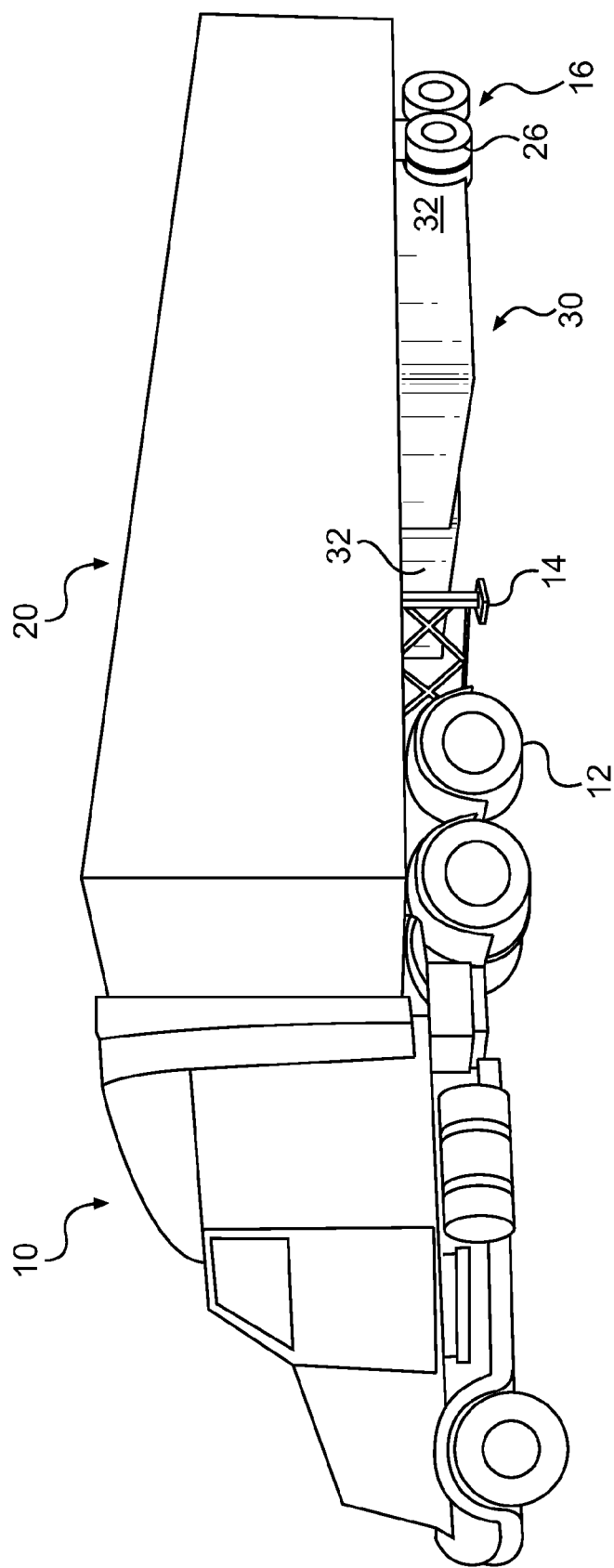
FIG. 1 is a perspective view of a road tractor and a road trailer with a skirt assembly secured thereto.
Figure 2:
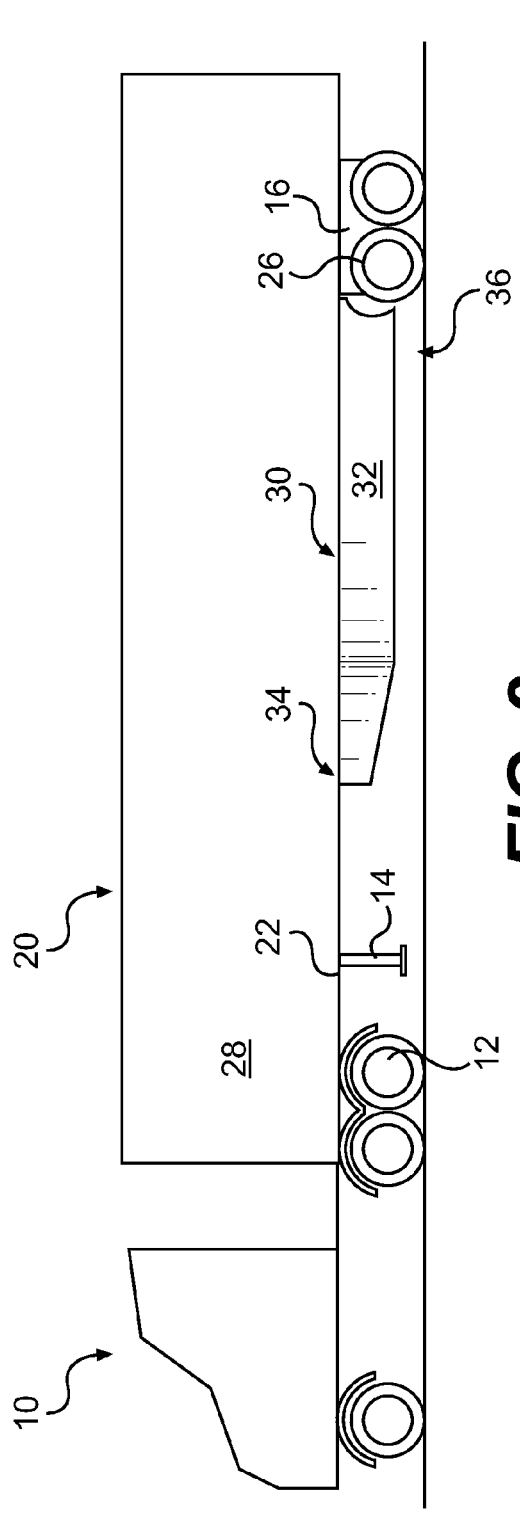
FIG. 2 is a left elevational view of the road tractor of FIG. 1.
Figure 3:
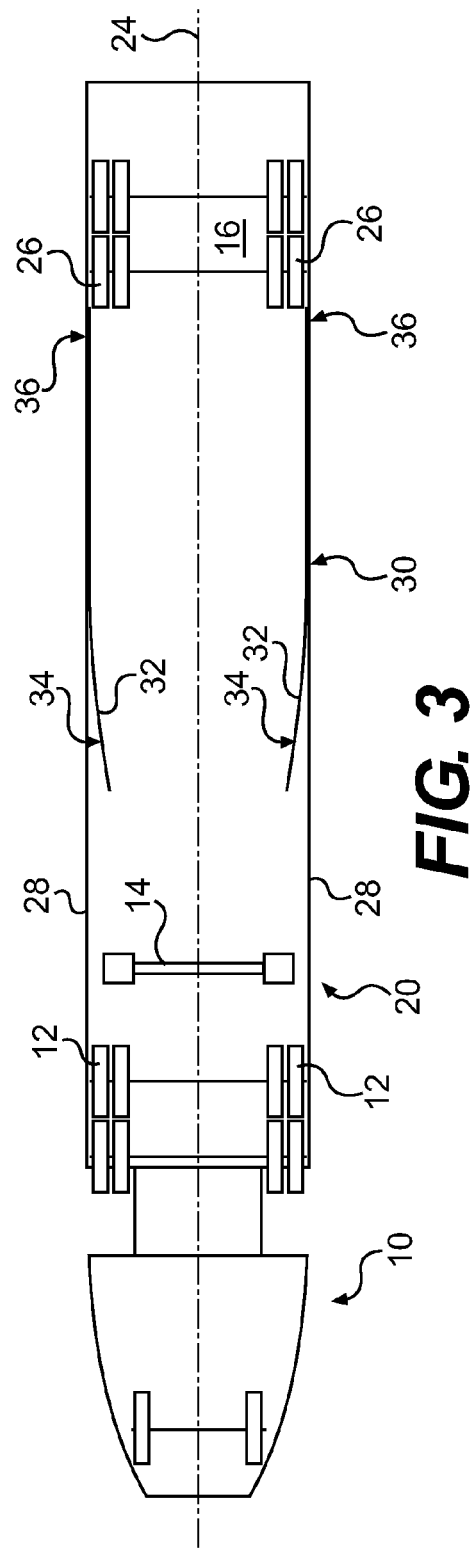
FIG. 3 is a bottom plan view of the road tractor of FIG. 1.

FIGS. 1, 2 and 3 illustrate a road tractor 10 with a road trailer 20 attached thereto equipped with a pair of skirt assemblies 30, installed on each side of the road trailer 20, adapted to deflect and direct the airflow around the road trailer 20. Each skirt assembly 30 includes a skirt panel 32, adapted to be disposed on the side of the road trailer 20, and a plurality of securing members adapted to secure the skirt panel 32 to the road trailer 20. The securing members are not illustrated on FIGS. 1, 2 and 3 and will be discussed in more details later in this specification. Once installed on the road trailer 20, the skirt assembly 30 helps channel the flow of air around the road trailer 20 to reduce the air drag of the vehicle when the road trailer 20 moves on the road, pulled by the road tractor 10.

The skirt assembly 30 of the present embodiment is mostly located under the road trailer 20, between the wheels 12 of the road tractor 10 and the wheels 26 of the road trailer 20. The skirt panels 32 can alternatively extend forward up to the trailer supports 14 of the road trailer, and be secured thereto, thus preventing complex skirt panel 32 arrangements through the trailer supports 14. The skirt panels 32 are substantially vertically positioned on each side of the road trailer 20 with a clearance with the ground by illustratively about 15-25 centimeters (about 6 to 10 inches). The air management around the trailer 20 provided by the skirt assembly 30 reduces the air drag created by the road trailer 20 by directing the flow of air around the road trailer 20. The flow of air would otherwise turbulently move around and below the road trailer 20 to create substantial air drag. The airflow management around the road trailer 20 provided by the skirt assembly 30 helps maintain laminar airflow around the road trailer 20 that helps diminish fuel consumption of the road tractor 10. The skirt assembly 30 also improves the safety of the vehicle by providing a barrier that can significantly prevent foreign objects to get under the road trailer 20.

The skirt panel 32 can also be used to display advertising thereon. Each skirt panel 32 provides additional display area in addition to the road trailer's wall 22.

As illustrated, the skirt panel 32 is shaped with an optional progressive height from the forwardmost portion 34. The skirt panels 32 can alternatively also be installed at an angle, in respect to the vertical, on the road trailer 20 to change the airflow pattern around the road trailer 20 and more precisely adjust the aerodynamics to a specific vehicle shape.

It can be appreciated from FIG. 3 that each skirt panel 32 is installed directly on the side of the road trailer 20 and, when seen from above, have a front portion 34 that progressively proximally leans toward the center 24 of the road trailer 20. The recessed front portion 34 of the skirt panel 32 improves the collection of the turbulent airflow generated by the road tractor 10 thus improving the aerodynamic efficiency of the skirt assembly 30. Additional explanation about the shape of the skirt panel 32 will be provided in further details below.

Figure 4:
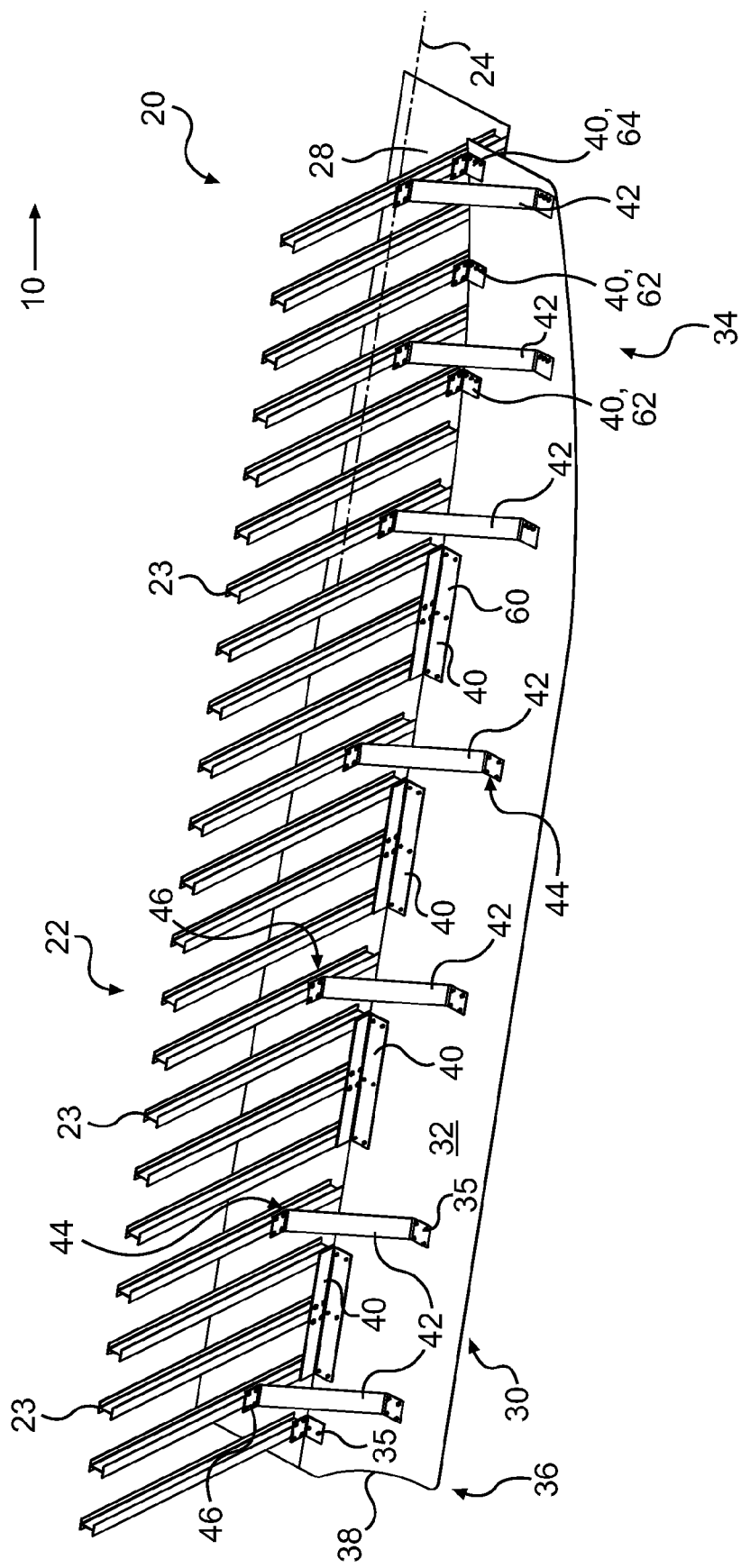
FIG. 4 is a left-front perspective view of a portion of a floor section of the road trailer of FIG. 1.

FIG. 4 is a perspective image of the skirt assembly 30 installed on the left side of a road trailer 20 from which is only illustrated a series of frame members 23 forming a portion of the road trailer floor frame 22. A series of angle supports 40 are secured to the trailer to secure the juxtaposed skirt panel 32 thereto. The angle supports 40 could be omitted altogether and the skirt panel could alternatively be attached directly to the road trailer 20 without deviating from the scope of the present application. The rear portion 36 of the skirt panel 32 is preferably positioned on the edge of the road trailer's wall 28. It is also encompassed by the present invention that the skirt panel 32 be installed a little in recess about the side of the road trailer 20 to avoid winches, lights, toolbox or ladders located on the side/edge of the road trailer 20. In contrast, it can be appreciated that the front portion 34 of the skirt panel 32 is progressively positioned and secured toward the center 24 of the road trailer 20. The skirt panel 32 is secured adjacent to the frame 22 with a series of angle supports 40 secured to both the frame members 23 and the skirt panel 32. Lower, the skirt panel 32 is secured to the road trailer 20 with a series of intervening resilient struts 42 also secured to both the frame members 23 and the skirt panel 32. Additional details about the angle supports 40 and the resilient struts 42 are provided later in reference with FIG. 7 through FIG. 11.

Still referring to FIG. 4, it can be appreciated that the upper series of holes 35 disposed on a top portion of the skirt panel 32 is used to fasten the skirt panel 32 to respective angle supports 40 that, themselves, are secured to frame members 23 of the road trailer 20. A number of connection points between the skirt panel 32 and the road trailer 20 are used to ensure the skirt panel 32 is well secured to the road trailer 20 and will not vibrate or deflect (some deflection can be acceptable under certain conditions) during operation. The series of holes 35 disposed on a lower portion of the skirt panel 32 are adapted to fasten to an end of each resilient strut 42. Similarly, the other end of the resilient strut 42 is connected to the frame members 23 of the road trailer 20 via a fastener mechanism that will be discussed below in details.

A curved portion 38 is defined on the rear portion 36 of the skirt panel 32 and preferably corresponds to the exterior shape of the adjacent wheel 26 of the road trailer 20. In so doing, it is possible to install the skirt panel 32 close to the wheel 26 without risking any contact therebetween. The skirt panel 32 should be installed as close as possible to the road trailer wheels 26 to maximize its efficiency. It is preferable to leave a distance between the wheel 26 of the road trailer 20 and the skirt panel 32 to avoid any risk of interference therebetween.

The wheels 26 of a road trailer 20 are commonly adapted to be longitudinally adjustable to distribute the mass of the road trailer 20 in a desired fashion. The adjustment of the position of the axels of a road trailer 20 is desirable, for instance, when a heavy load is carried or during thaw and freeze periods. In this respect, and to avoid reinstalling the skirt panel 32 in various positions on the road trailer 20, it might be desirable to install the skirt panel 32 in respect with the forwardmost possible position of the axels of the road trailer 20. That would prevent to remove and reposition the skirt panel 32 when the trolley's 16 position is modified.

The road trailer wheels 26 are mounted on a road trailer buggy 16 adapted to move the wheels 26 along a portion of the road trailer's length to distribute the weight of the road trailer 20 in a desired fashion. The skirt assembly 30 is preferably permanently secured to the road trailer 20 taking in consideration the forwardmost position of the trailer buggy 16. The gap between the skirt panel 32 and the road trailer's wheels 26 is however increased when the trailer buggy 16 is move toward the rear of the road trailer 20 thus likely reducing the aerodynamic efficiency of the skirt assembly 30. The present invention provides a skirt panel extension module 33 adapted to reduce the gap between the skirt panel 32 and the road trailer's wheels 26 to prevent any aerodynamic efficiency reduction. The skirt panel extension modules 33 are secured to the road trailer in a similar fashion. The skirt panel extension module 33 can be provided in various lengths to fill gaps of various sizes. They can also be provided as skirt panel extension modules 33 kit. An alternate embodiment provides a sliding skirt panel extension 33 that is permanently secured to the road trailer 20 and extendable to the desired length when the trailer buggy 16 is moved.

Figure 6:
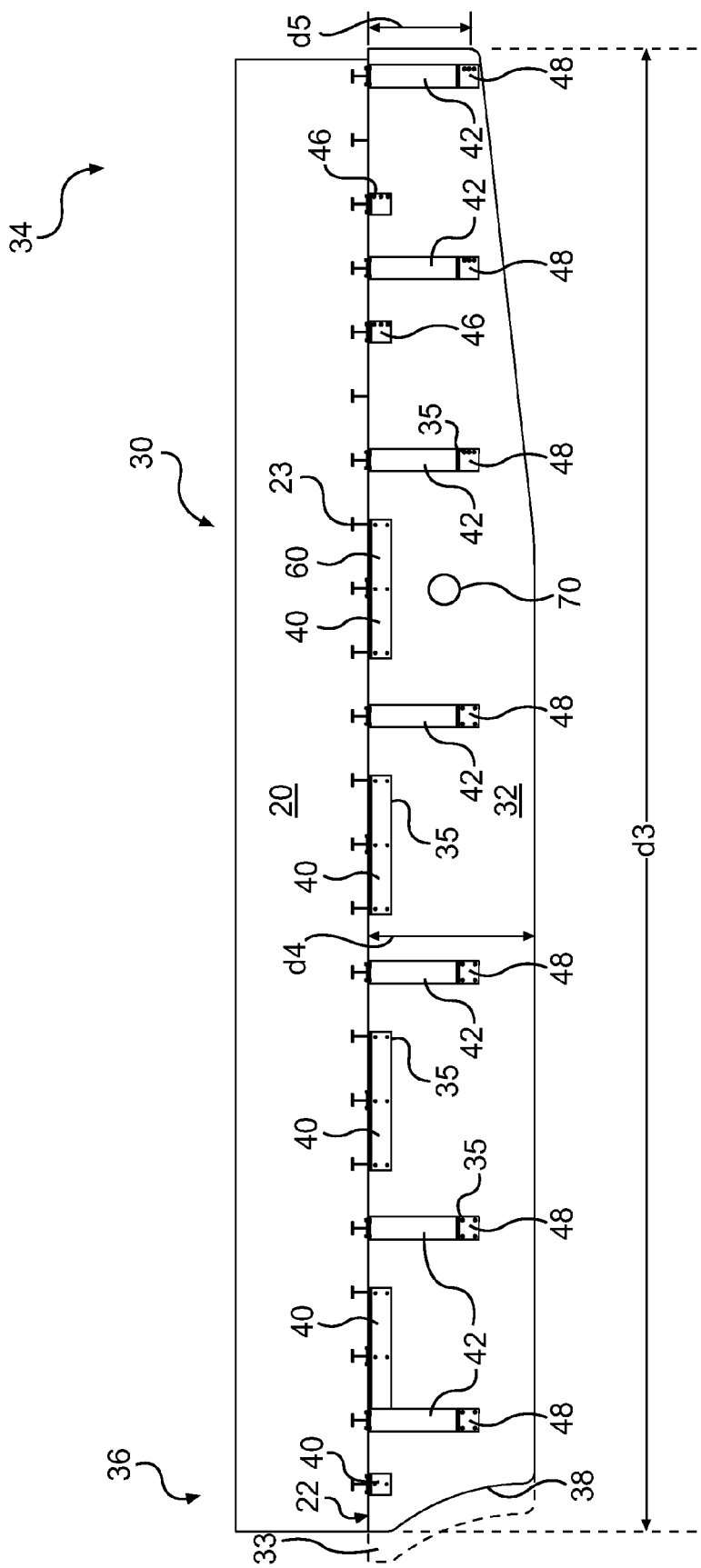
FIG. 6 is a right elevational section view of a portion of the road trailer and the skirt assembly of FIG. 1.

A skirt panel extension 33, illustrated on FIG. 6, can alternatively be added between the skirt panel 32 and the wheels 26 when the axles of the road trailer 20 are located in a rearward position leaving an increased distance therebetween to improve the aerodynamic efficiency of the skirt assembly 30. A reasonable distance between the skirt panel 32 and the wheels 26 could be between about 15 centimeters and about 30 centimeters although a shorter distance, or even a superposition of the skirt panel 32 (or skirt panel module(s) 33) over the wheel 26, can be achieved.

Figure 5:
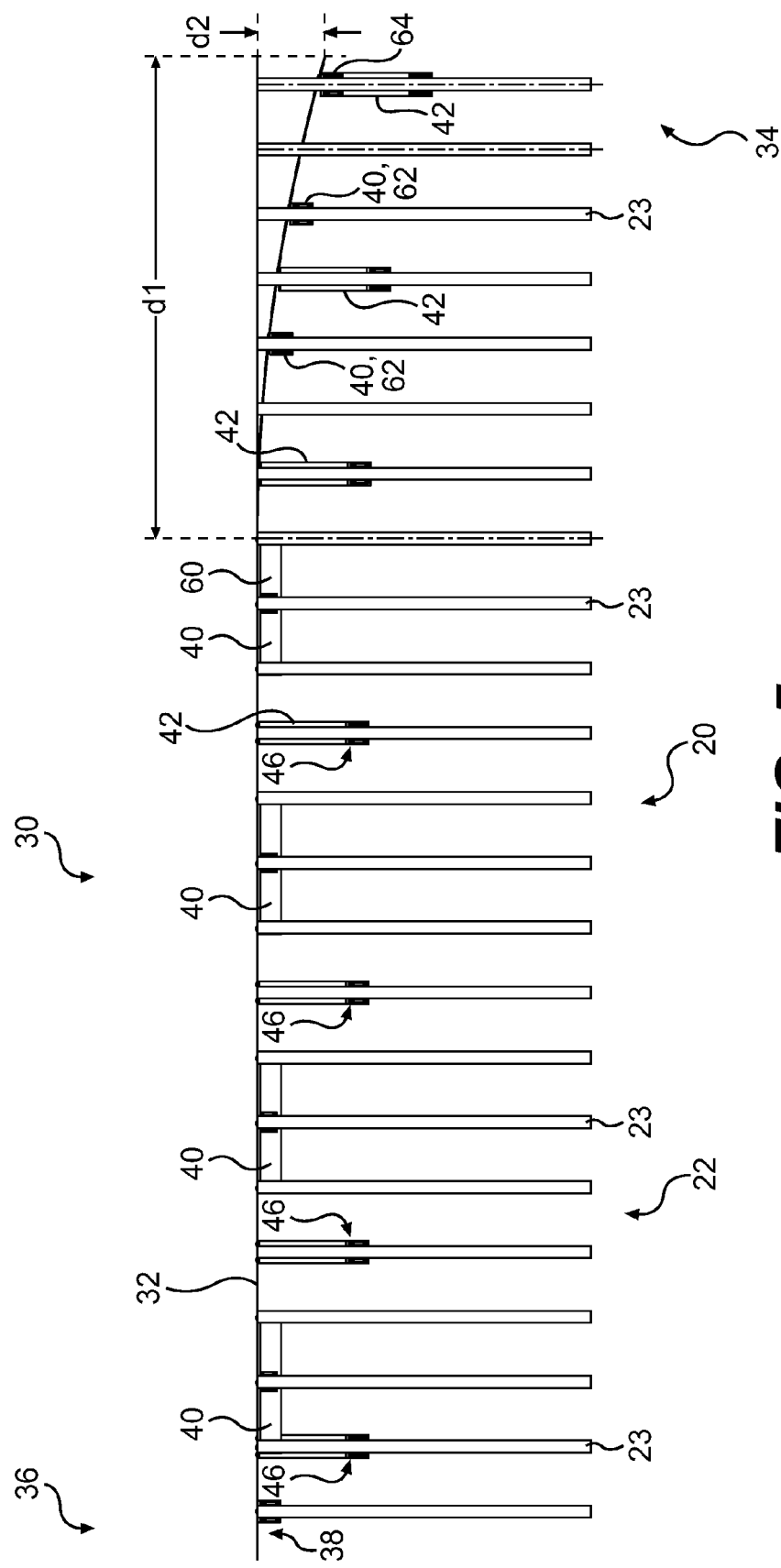
FIG. 5 is a top plan view of a portion of the floor section of FIG. 4.

FIG. 5 is a top elevational view of the road trailer frame 22. As mentioned above, it can be appreciated from FIG. 5 that the skirt panel 32 is disposed inwardly on the forward portion of the road trailer 20 and is progressively located on the edge of the road trailer's wall 28 toward the rear end of the road trailer 20. A departure angle support 60 and a cooperating forward angle support 64 are secured to the road trailer to correctly locate the skirt panel 32 on the road trailer 20. The departure angle support 60 and the forward angle support 64 are installed on the trailer 20 prior to install the skirt panel 32. The rear portion 36 of the skirt panel 32 is secured to the road trailer 20 up to the departure angle support 60 and then the skirt panel 32 is bent to reach the forward angle support 64 and secured thereto. That bent locates the skirt panel 32 to the road trailer 20 and defines the shape of the skirt panel 32 with the desired progressive proximal bent. The remaining angle supports 62 and resilient struts 42 are installed thereafter to further secure the assembly.

The rear portion 36 of the skirt panel 32 is intended to be secured to the road trailer to leave only a minimum gap with the road trailer wheels 26 to improve the aerodynamic efficiency of the skirt assembly 30. The skirt panel 32 extends to the front of the road trailer 20 and defines a curve portion on its front portion 34. A long skirt 32 appears to be more efficient than a shorter skirt panel 32 and should therefore extend as far as possible to the front of the road trailer 20. However, for reasons of complexity, the front portion 34 of the skirt panel 32 is likely to stop at the trailer supports 14. It is nonetheless encompassed by the present invention that the skirt panel 32 alternatively extends in front of the trailer supports 14.

In an embodiment of the invention adapted to fit a standard 16.1 meters (53 feet) road trailer 20 the forward end of the departure angle support 60 is located at a distance $d_1$ from the forward end of the skirt panel 32. A forward angle support 64 is secured to the frame at a distance $d_2$ from the side edge of the road trailer 20. Distance $d_1$ is about between 1.5 meter and 3 meters, preferably about between 2 meters and 2.5 meters and most preferably about between 2.1 meters and 2.4 meters. Distance $d_2$ is about between 0.20 meter and 0.40 meter, preferably about between 0.25 meter and 0.35 meter and most preferably about 0.27 meter and 0.32 meters. More precisely, distance $d_1$ is preferably about 2.29 meters and distance $d_2$ is preferably about 0.31 meter in a preferred embodiment. Corresponding angle supports 40 and resilient struts 42 are installed to further secure the skirt panel 32 at the desired position.

A left side elevational view schematically illustrating, on FIG. 6, the overall size of the skirt panel 32. Length $d_3$ of the skirt panel 32 is about between 5 meters and 9 meters, preferably about between 6 meters and 8 meters and most preferably about between 6.5 meters and 7.5 meters. The height $d_4$ of the skirt panel 32 is about between 0.5 meter and 1 meter, preferably about between 0.6 meter and 0.9 meter and most preferably about between 0.7 meter and 0.8 meter. And the forwardmost height $d_5$ of the skirt panel 32 is about between 0.3 meter and 0.7 meter, preferably about between 0.4 meter and 0.6 meter and most preferably about between 0.45 meter and 0.5 meter. More precisely, distance $d_4$ is preferably about 0.76 meter and distance $d_5$ is preferably about 0.48 meter in a preferred embodiment.

Alternate embodiments providing a skirt assembly sized and designed to fit road trailers of different lengths can be inferred from the dimensions discussed above. For instance, a skirt assembly can be designed to fit a 14.6 meters (48 feet) road trailer 20 or any other road trailer 20 sizes and lengths.

As further illustrated on FIG. 6, the skirt panel 32 is provided with a series of holes 35 used to connect the skirt panel 32 to the road trailer 20. The series of holes 35 disposed on the upper portion of the skirt panel 32 is used to connect the skirt panel 32 to the frame 22 of the trailer 20 whereas, in a similar fashion, the series of holes 35 disposed on the bottom portion of the skirt panel 32 is used to connect the skirt panel 32 to the skirt connecting portion 48 of the resilient strut 42. The resilient strut 42 is connected to the frame member 23 of the trailer via the trailer connecting portion 46 of the resilient strut 42. The skirt connecting portion 48 and the trailer connecting portion 46 are provided with respective series of holes 35 to receive fasteners therein. The holes 35 can be factory pre-drilled or can be drilled during installation to ensure desired customization. Rivets or bolts are placed in the holes 35 to secure the skirt panel 32 to the trailer frame 22 or the support assembly. Other appropriate fastening mechanism variations well known in the art are encompassed by the present disclosure and can be used without departing from the scope of the invention.

An opening 70 is defined in the skirt panel 32 to allow access to an optional fuel tank disposed on the road trailer 20 to fuel an onboard generator or freezer. Such a fuel tank is commonly disposed under the floor 22 of the road trailer 20 and is most likely hidden by the skirt assembly 30. The opening is sized, designed and located on the skirt panel 32 to allow access to the fuel tank. A door (not illustrated) can optionally be added to close the opening 70.

Figure 7:
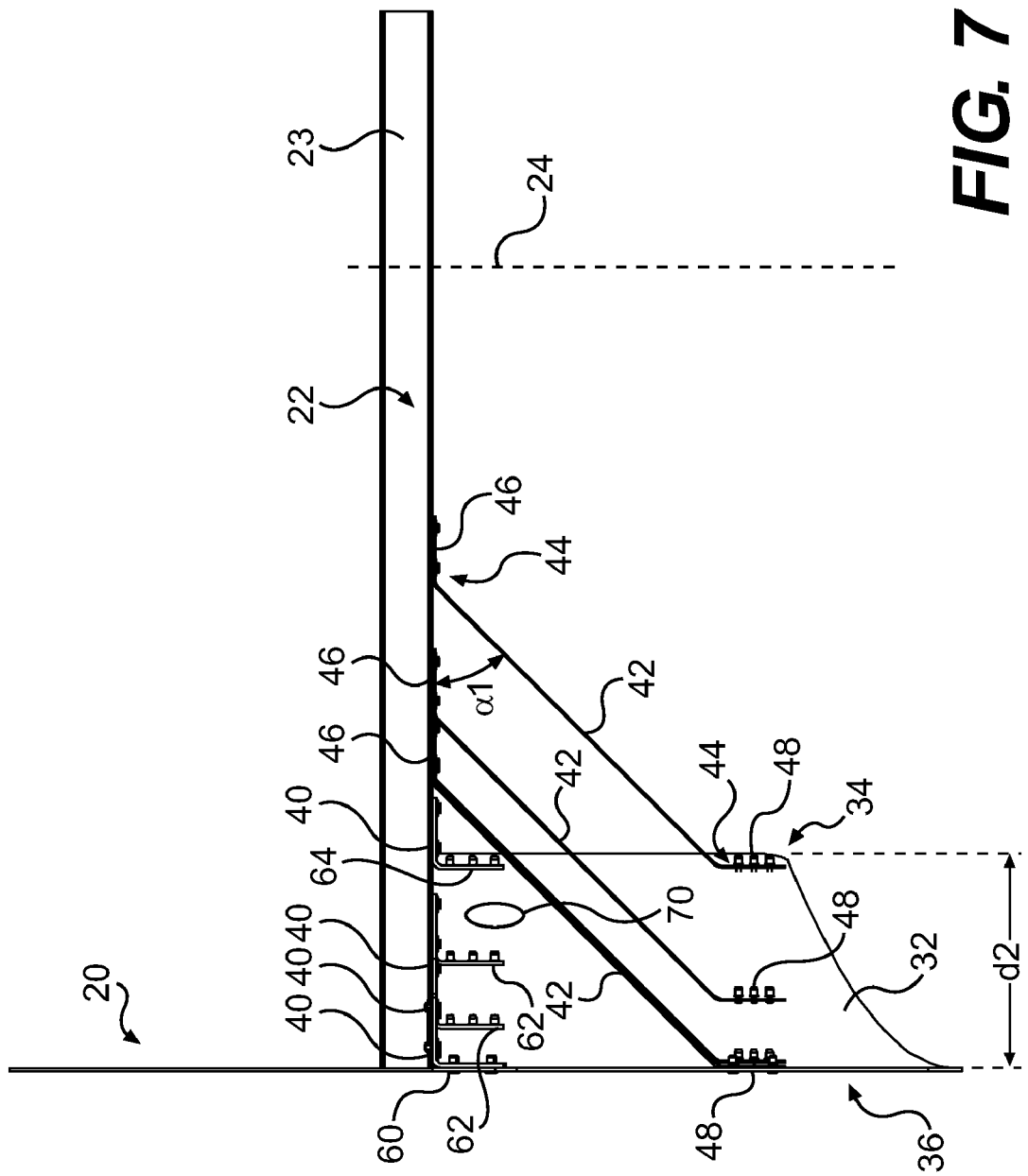
FIG. 7 is a rear elevational section view of a portion of the road trailer and the skirt assembly of FIG. 1.

Turning now to FIG. 7 where is illustrated a plurality of resilient struts 42 and angles support 40 secured between the frame 22 and the skirt panel 32. The rear elevational view shows that the front portion 34 of the skirt panel 32 is proximally recessed from the left lateral side of the trailer 20 by, illustratively, about 30 centimeters. It can also be appreciated that the skirt panel 32 is held to the road trailer frame 22 via the series of angled support 40 on its upper portion. The lower portion of the skirt panel 32 is connected to the trailer connecting portion 46 of the resilient strut 42 at an angle $\alpha_1$, which is an angle of about 45° in the present illustrative embodiment and could be different without departing from the present description.

In one embodiment, the resilient strut 42 has a rectangular section and is made of composite material. Recommended multilayer composite material, or reinforced thermoplastic manufactured by Transtex Composites Inc is used in the present embodiment. The composite material forming the resilient struts 42 of the illustrative example is shaped in a rectangular section to allow the resilient strut 42 to bend when the skirt panel 32 is pushed toward the center of the road trailer 20 (proximally) when, for instance, contacting an obstacle or having a force applied thereon. The resilient strut 42 bends, allowing a significant displacement of the bottom portion of the skirt panel 32, is adapted to retrieve its original position when the force is removed from the skirt panel 32. The resilient strut 42 is preferably made of a one-piece material where both ends are slightly angled 44 to evenly contact the skirt panel 32 and the road trailer frame member 23. In so doing, no additional intervening parts are required between the resilient strut 42 and both the skirt panel 32 and the road trailer frame member 23.

The resilient struts 42 of the present embodiment is about 4 millimeters thick and can reach a radius of 20 centimeters without going into plastic deformation or breaking. Generally, the thinner the resilient strut 42 is, the shorter will be its maximum radius of curvature. A lateral proximal displacement of about 60 centimeters of the bottom portion of the skirt panel 32 is possible. The lower portion of the skirt panel 32 can even reach, under certain circumstances, a position parallel with the trailer 20 floor. The skirt assembly 30 and the skirt panel 32 will recover their original positions when the force causing the bending is removed. Further, the bending of the resilient struts 42 provides energy absorption in case of impact from another vehicle for example. It can be noted that a distal displacement of the skirt panel 32 is possible. A distal displacement of the skirt panel 32 will occur when a properly directed force is applied to the skirt panel 32 to bend the skirt panel 32.

Figure 8:
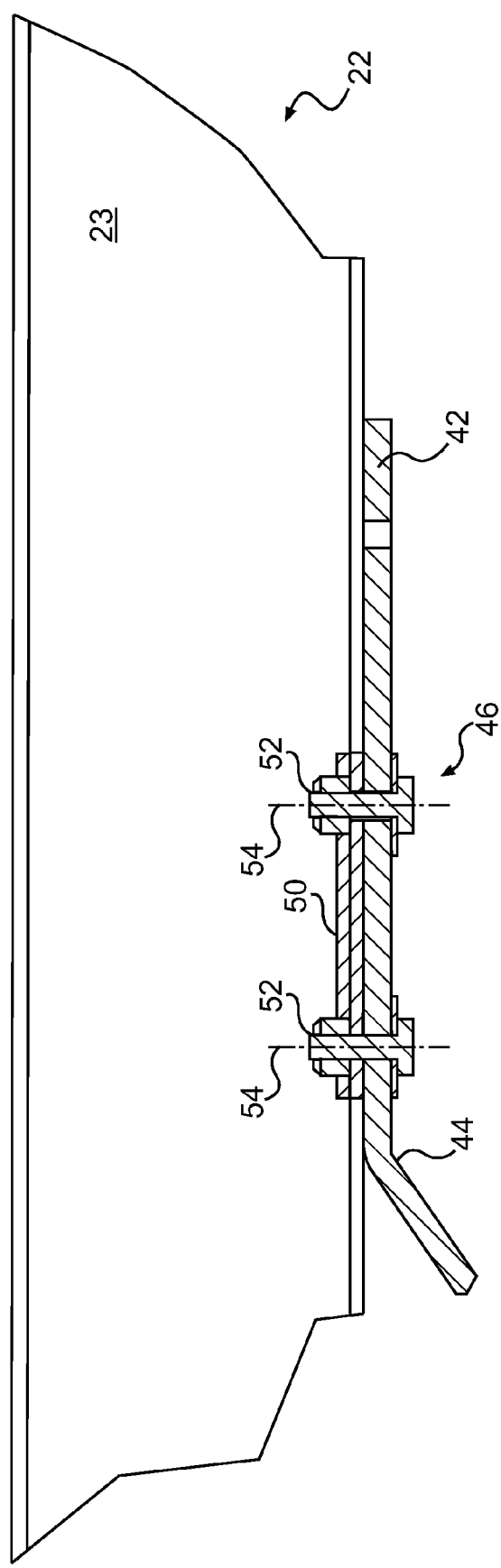
FIG. 8 is a rear elevational view of a portion of the securing mechanism of the skirt to the road trailer's floor.
Figure 9:
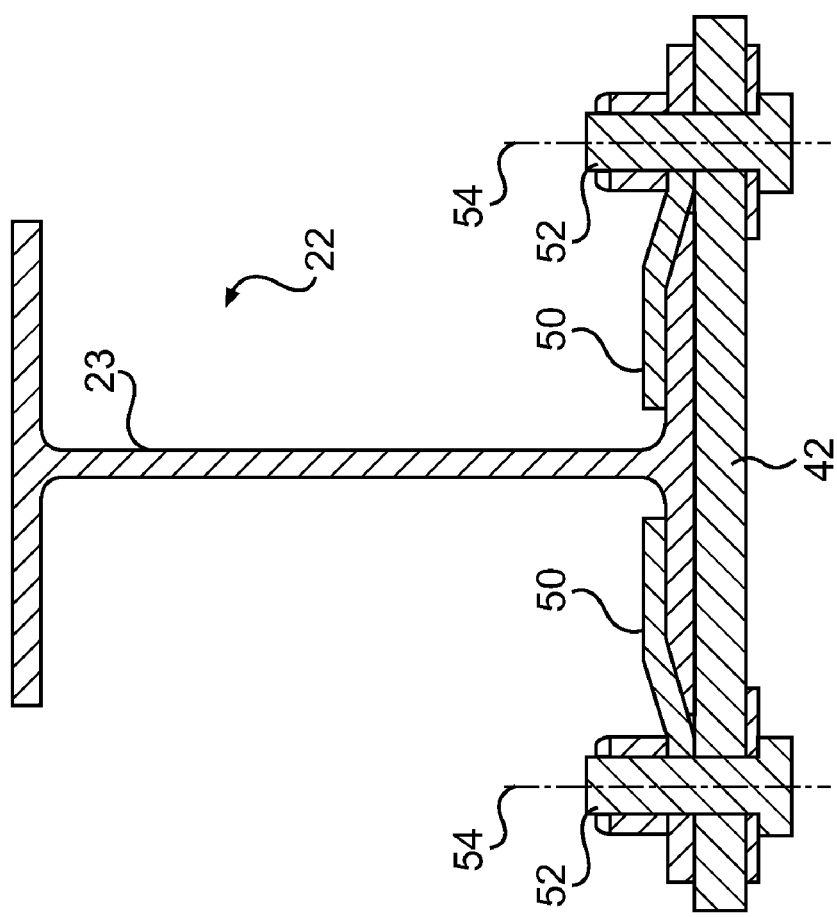
FIG. 9 is a section view of a portion of the road trailer's floor with the securing mechanism attached thereto.

FIGS. 8 and 9 depict with more details the connection mechanism between the resilient struts 42 and the trailer frame members 23. One of the resilient strut 42 ends is juxtaposed on the lower surface of the road trailer frame 22. A set of holes, identified with holes axes 54, are used to fasten two clamps 50 with fastener 52, one on each side of the frame members 23, to secure the resilient strut 42 to the road trailer frame 22. The clamps 50 are illustratively made of a shaped stainless steel plate material to prevent corrosion.

Figure 10:
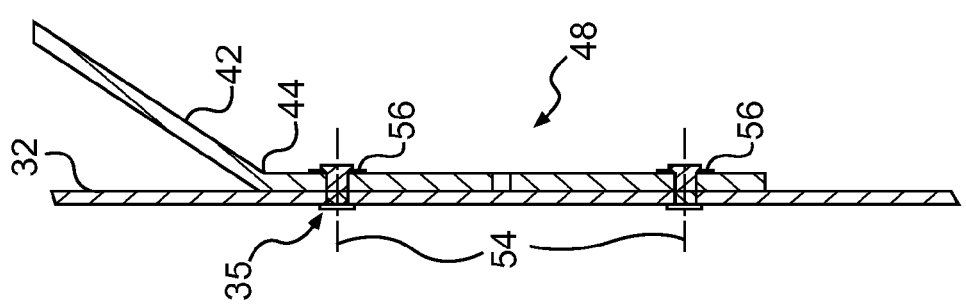
FIG. 10 is a rear elevational section view of a portion of the skirt's securing mechanism.

FIG. 10 illustrates the connection between the resilient strut 42 and the skirt panel 32. The end of the resilient strut 42 is positioned to the surface of the skirt panel 32 and secured thereto. Any types of fasteners 56 can be used to fasten both parts together. Rivets are preferably used although a bolt could also fit into the holes 54 performed in the skirt panel 32 and the resilient strut 42, and illustrated with hole axes 54 to secure the assembly. Glue or resin could alternatively be applied between the resilient strut 42 and the skirt panel 32 to secure the resilient strut 42 and the skirt panel 32 together and is also encompassed by the present invention.

Figure 11:
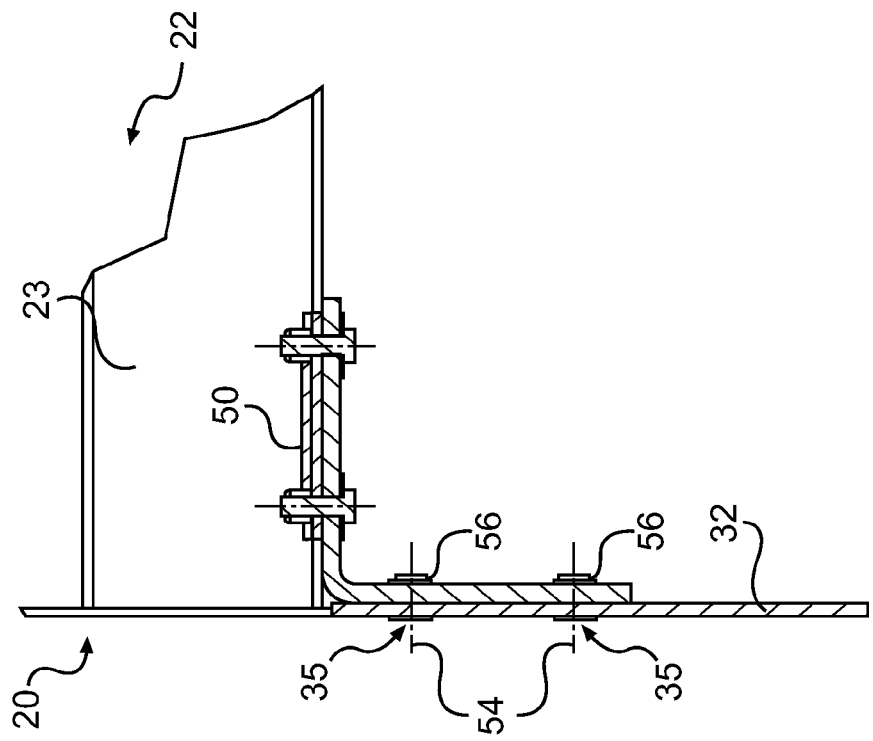
FIG. 11 is a rear elevational section view of a portion of the skirt's securing mechanism.

FIG. 11 shows the assembly between the upper portion of the skirt panel 32 and one of the angled supports 40. The angle support 40 is disposed next to the edge of the road trailer 20 to position the exterior surface of the skirt panel 32 significantly co-planar with the lateral wall of the road trailer 20. Again, any types of fasteners can be used to fasten both parts together. Rivets are preferably used but a bolt could also fit into the holes 54 in the skirt panel 32 and the angled support 40 to secure the assembly. Here again, glue or resin could alternatively be applied between the angle support 40 and the skirt panel 32 to permanently secure the angle support 40 and the skirt panel 32 together.

Figure 13:
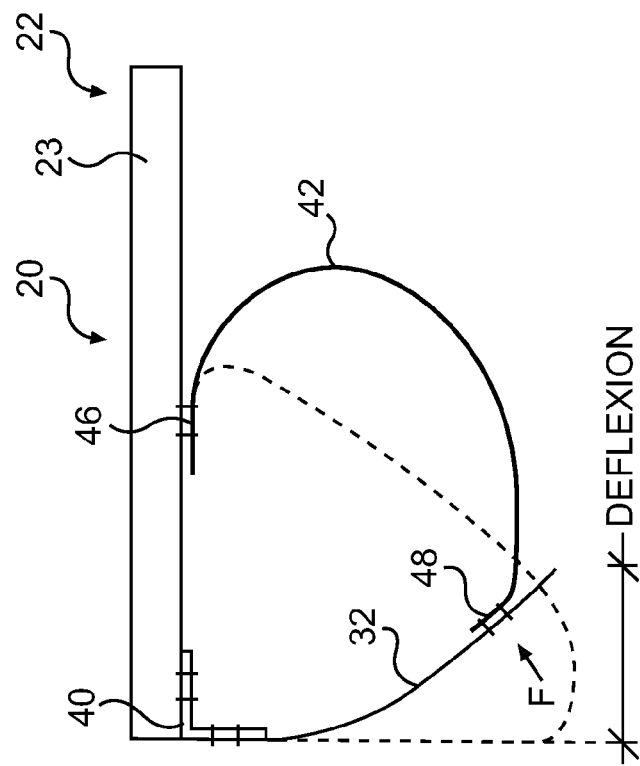
FIG. 13 is a rear elevational section view of an alternate embodiment of a portion of the skirt' securing assembly of FIG. 12 when deflected.
Figure 12:
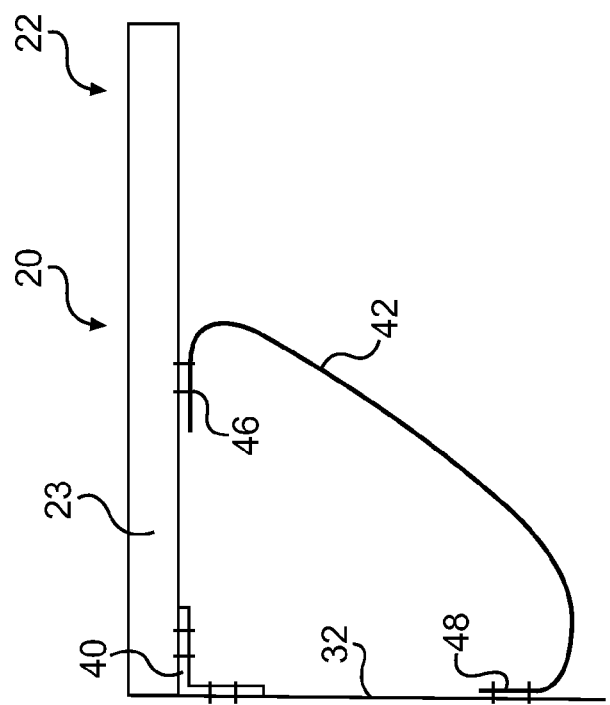
FIG. 12 is a rear elevational section view of an alternate embodiment of a portion of the skirt' securing assembly.

FIG. 12 and FIG. 13 illustrate an alternate embodiment where the resilient strut 42 is fixed to the trailer frame 22 and the skirt panel 32 differently. Instead of installing the resilient strut 42 with both ends slightly angled to mate with the skirt panel 32, both ends of the resilient strut 42 are further angled to contact the skirt panel 32 from the opposite side. This alternate layout assembly reduces the stress on the resilient strut 42, when the skirt panel 32 is deflected, for instance, under a force F, by expending the radius of curvature of the resilient strut 42 throughout the resilient strut 42 ergo significantly reducing local stress points in the resilient strut 42.

In another unillustrated embodiment, the section of the resilient strut 42 has a shape adapted to increase its stiffness. A "C" shaped resilient strut 42 can be manufactured. Alternatively, an embossed portion on a planar shaped resilient strut 42 can also be manufactured. Preferably, the selected shape should prevent dirt and road debris to keep stuck on the resilient strut 42. The shape can also be uneven along the length of the resilient strut 42 to provide an uneven flex to the resilient strut 42.

As would be appreciated by those skilled in the art, in view of the present specification, the nature of the material used to build the skirt panel 32 and the resilient strut 42 can vary. These materials are also contemplated to fall within the scope of the invention if they lead to the flexibility and resilience required to build a resilient skirt assembly 30.

Figure 14:
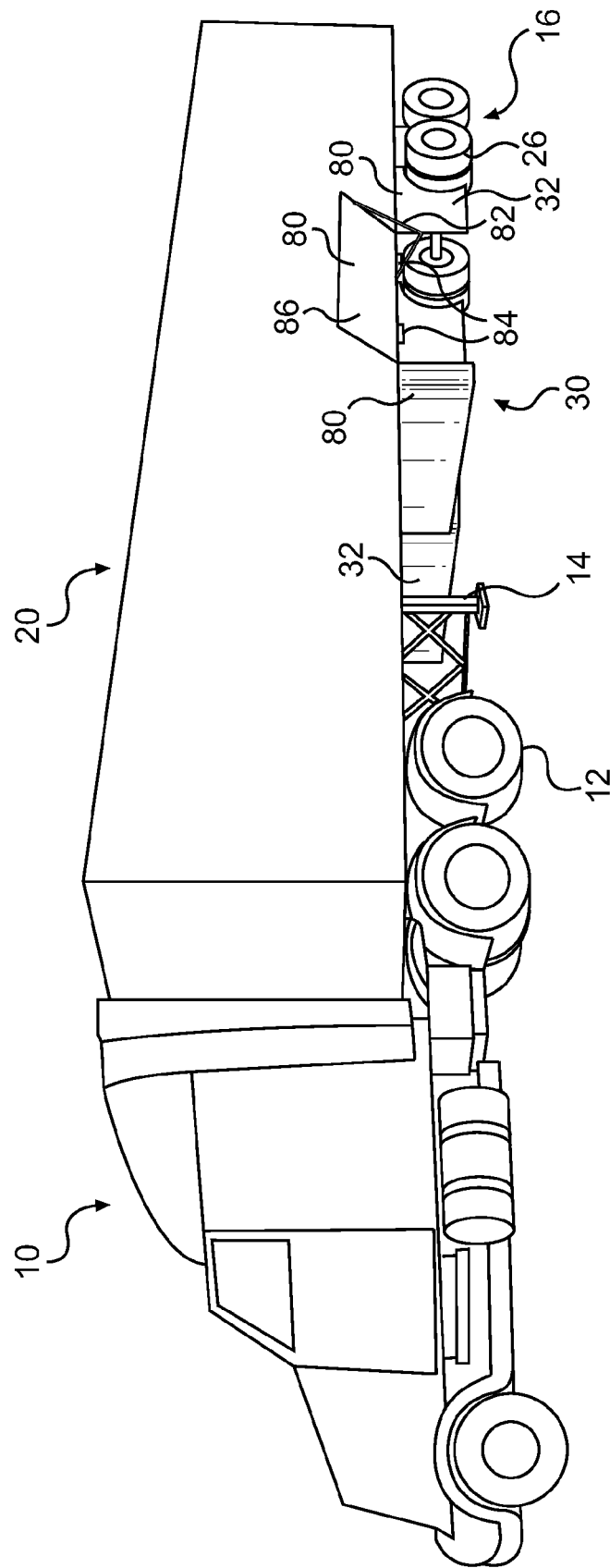
FIG. 14 is a perspective view of a road tractor and a road trailer with a skirt assembly secured thereto and a skirt panel module in the opened position.
Figure 15:
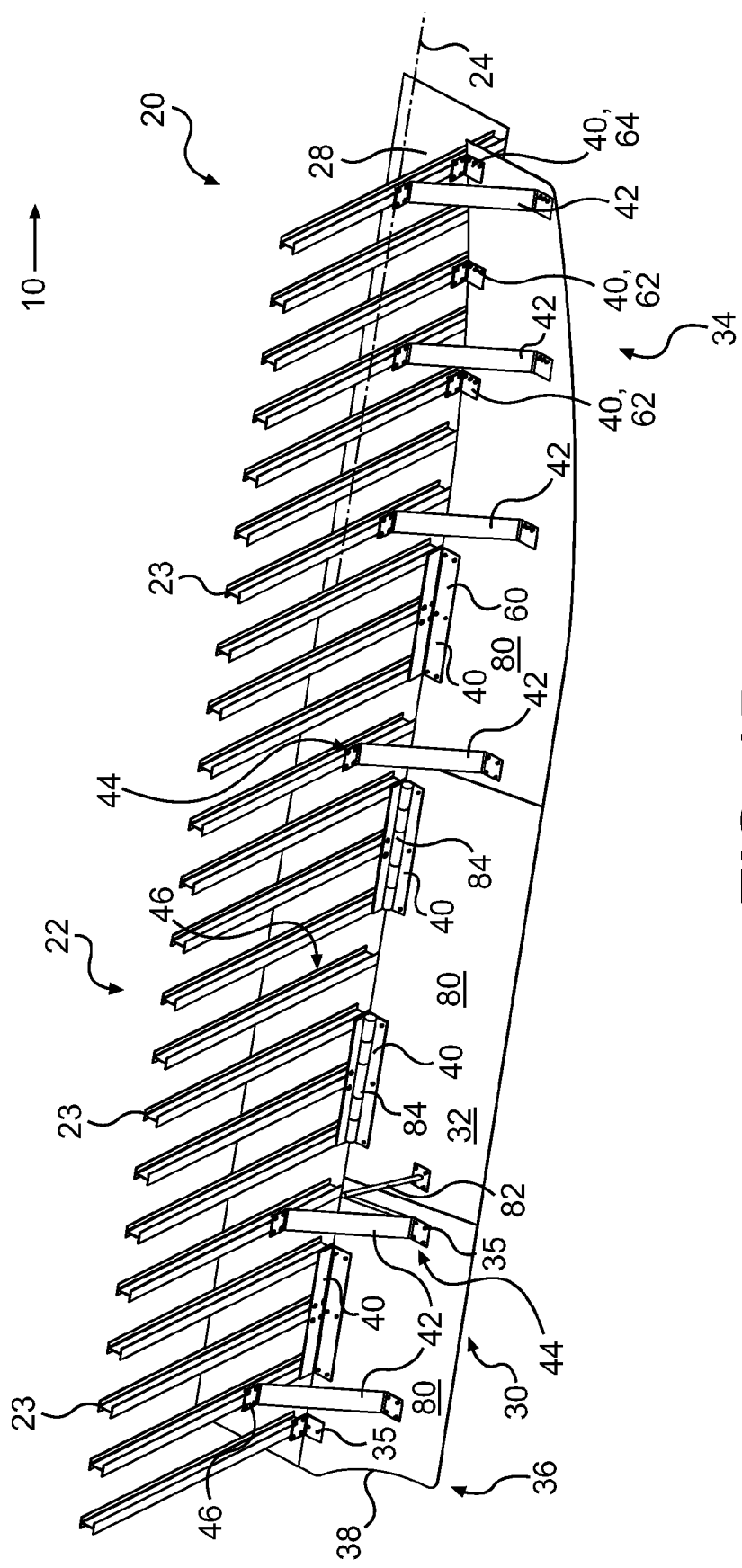
FIG. 15 is a left-front perspective view of a portion of a floor section of the road trailer of FIG. 14.

Turning now to FIG. 14 and FIG. 15, illustrating the road tractor 10 and the road trailer 20. In this embodiment the skirt panel 32 is constructed with a plurality of skirt panel modules 80. A pivoted skirt panel module 86 is adapted to be pivoted about hinges 84 to give access under the road trailer 20. A support member 82 is also provided to maintain the pivoted skirt panel module 86 in its opened position. The support member 82 being composed of a suspension means and a damper means.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

The invention claimed is:

1. A resilient aerodynamic skirt adapted to be substantially longitudinally mounted to a trailer, the resilient aerodynamic skirt comprising a skirt panel defining a front portion and a rear portion, the front portion being adapted to be laterally proximally mounted toward a forward portion of the trailer and the rear portion being adapted to be laterally distally mounted in respect with the forward portion toward a rear portion of the trailer, the skirt panel defining a curved portion between the front portion and the rear portion when mounted on the trailer in an aerodynamic configuration, the skirt panel being adapted to bend away from the aerodynamic configuration when contacting a foreign object and to recover its aerodynamic configuration thereafter, wherein the resilient aerodynamic skirt comprises a resilient strut securing the skirt panel to the trailer, the resilient strut being adapted to bend when the skirt panel bends away from the aerodynamic configuration.

2. The resilient aerodynamic skirt of claim 1, wherein the skirt panel is made of composite materials.

3. The resilient aerodynamic skirt of claim 1, wherein the skirt panel is planar when not installed on the trailer and longitudinally progressively curved when installed on the trailer in the aerodynamic configuration.

4. The resilient aerodynamic skirt of claim 1, wherein the skirt panel progressively bends from a top portion thereof to a bottom portion thereof such that the skirt panel is stressed when bent away from the aerodynamic configuration.

5. The resilient aerodynamic skirt of claim 1, wherein the resilient strut is made of composite materials.

6. The resilient aerodynamic skirt of claim 1, wherein the resilient strut bends in an arcuate shape.

7. The resilient aerodynamic skirt of claim 1, wherein the resilient strut has a constant section.

8. The resilient aerodynamic skirt of claim 1, wherein the resilient strut is a plurality of resilient struts.

9. The resilient aerodynamic skirt of claim 1, wherein the resilient strut is in the aerodynamic configuration when the load applied thereon is provided by air pressure routed by the skirt panel and is adapted to bend away from the aerodynamic configuration when the load applied thereon is provided by a physical contact with a foreign object.

10. The resilient aerodynamic skirt of claim 1, wherein the skirt panel is planar when not installed on the trailer and longitudinally progressively defining two opposite curves therein when installed on the trailer in the aerodynamic configuration.

11. The resilient aerodynamic skirt of claim 1, wherein the resilient strut is disposed at an acute angle between a floor of the trailer and the skirt panel.

12. The resilient aerodynamic skirt of claim 11, wherein the angle of the resilient strut forms an angle of between 10 degrees and 70 degrees with the skirt panel.

13. A method of installing a resilient skirt assembly on a trailer, the method comprising:

securing a skirt panel to the trailer, the skirt panel defining a front portion and a rear portion, the front portion being adapted to be laterally proximally mounted toward a forward portion of the trailer and the rear portion being adapted to be laterally distally mounted in respect with the forward portion toward a rear portion of the trailer, the skirt panel defining a curved portion between the front portion and the rear portion when mounted on the trailer in an aerodynamic configuration; and securing at least one resilient strut between the trailer and the skirt panel, the at least one resilient strut maintaining the skirt panel in an aerodynamic configuration, the at least one resilient strut allowing the skirt panel to bend away from the aerodynamic configuration when contacting a foreign object and to recover its aerodynamic configuration thereafter.

14. The method of claim 13, wherein the at least one resilient strut is secured at an acute angle between the trailer and the skirt panel.

15. The method of claim 13, further comprising stressing the skirt panel to bend the at least one resilient strut and bend the skirt panel.

16. A resilient skirt assembly kit comprising:

a skirt panel adapted to be disposed on a trailer to aerodynamically route air along the trailer, the skirt panel defining a front portion and a rear portion, the front portion being adapted to be laterally proximally mounted toward a forward portion of the trailer and the rear portion being adapted to be laterally distally mounted in respect with the forward portion toward a rear portion of the trailer, the skirt panel defining a curved portion between the front portion and the rear portion when mounted on the trailer in an aerodynamic configuration; and a plurality of resilient struts adapted to secure the skirt panel to the trailer.

17. The kit of claim 16, wherein at least some of the resilient struts are made of composite materials.

18. The kit of claim 16, wherein the skirt panel is adapted to be installed on the trailer in an aerodynamic configuration and is adapted to resiliently bend away from the aerodynamic configuration.

* * * * *

UNITED STATES PATENT AND TRADEMARK OFFICE
CERTIFICATE OF CORRECTION

PATENT NO.         : 7,748,772 B2                                           Page 1 of 1
APPLICATION NO.    : 12/436970
DATED              : July 6, 2010
INVENTOR(S)        : Mathieu Boivin It is certified that error appears in the above-identified patent and that said Letters Patent is hereby corrected as shown below:

It appears that the above-identified patent has been published without mention of its complete priority claim.

Title Page, item 62

Division of application No. 12/360,038, filed on January 26, 2009 that claims priority from United States Provisional Patent application No. 61/024,217, filed January 29, 2008, entitled AERODYNAMIC TRAILER SKIRT.

Signed and Sealed this
First Day of March, 2011

David J. Kappos
*Director of the United States Patent and Trademark Office*

(12) EX PARTE REEXAMINATION CERTIFICATE (9729th)
United States Patent
Boivin et al.

(10) Number: US 7,748,772 C1
(45) Certificate Issued: *Jun. 27, 2013

(54) RESILIENT AERODYNAMIC TRAILER SKIRTS

(75) Inventors: Mathieu Boivin, Montreal (CA);
Philippe Desjardins, Montréal (CA);
Mathieu Desjardins, Montréal (CA)

(73) Assignee: Transtex Composite Inc, Montreal (CA)

Reexamination Request:
No. 90/012,245, Apr. 9, 2012

Reexamination Certificate for:
Patent No.: 7,748,772
Issued: Jul. 6, 2010
Appl. No.: 12/436,970
Filed: May 7, 2009

Certificate of Correction issued Mar. 1, 2011

(*) Notice: This patent is subject to a terminal disclaimer.

Related U.S. Application Data

(62) Division of application No. 12/360,038, filed on Jan. 26, 2009, now Pat. No. 7,887,120.

(60) Provisional application No. 61/024,217, filed on Jan. 29, 2008.

(51) Int. Cl.
*B62D 35/02* (2006.01)

(52) U.S. Cl.
USPC .................................. 296/180.4; 180/903

(58) Field of Classification Search
None
See application file for complete search history.

(56) References Cited

To view the complete listing of prior art documents cited during the proceeding for Reexamination Control Number 90/012,245, please refer to the USPTO's public Patent Application Information Retrieval (PAIR) system under the Display References tab.

*Primary Examiner* — Russell Stormer

(57) ABSTRACT

A resilient aerodynamic skirt assembly is provided, the aerodynamic skirt assembly comprising a skirt panel adapted to connect to a trailer to route airflow along the trailer, skirt supports adapted to connect the skirt to a trailer are also provided with a plurality of resilient struts providing lateral support to the skirt panel, the resilient struts allowing substantial lateral deflection of the skirt panel away from an aerodynamic configuration. A method of assembling an aerodynamic skirt assembly and an aerodynamic skirt kit are also provided.

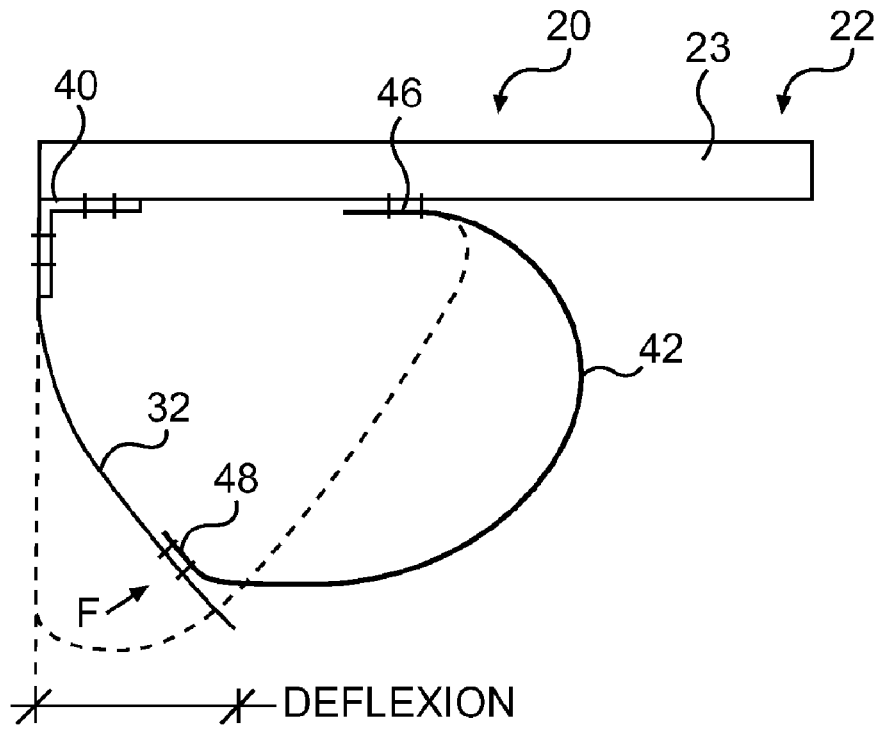

US 7,748,772 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 13 and 16 are determined to be patentable as amended.

Claims 2-12, 14, 15, 17 and 18, dependent on an amended claim, are determined to be patentable.

New claims 19-24 are added and determined to be patentable.

1. A resilient aerodynamic skirt adapted to be substantially longitudinally mounted to a trailer, the resilient aerodynamic skirt comprising a skirt panel defining a front portion and a rear portion, the front portion being adapted to be laterally proximally mounted toward a forward portion of the trailer and the rear portion being adapted to be laterally distally mounted in respect with the forward portion toward a rear portion of the trailer, the skirt panel defining a curved portion between the front portion and the rear portion when mounted on the trailer in an aerodynamic configuration, the skirt panel being adapted to bend away from the aerodynamic configuration when contacting a foreign object and to recover its aerodynamic configuration thereafter, wherein the resilient aerodynamic skirt comprises a resilient strut securing the skirt panel to the trailer, the resilient strut being adapted to bend *and sustain an elastic deformation without breaking* when the skirt panel bends away from the aerodynamic configuration *both proximally toward a center of the trailer and distally away from the center of the trailer, and to self-recover when the skirt panel returns to the aerodynamic configuration*.

13. A method of installing a resilient skirt assembly on a trailer, the method comprising:
securing a skirt panel to the trailer, the skirt panel defining a front portion and a rear portion, the front portion being adapted to be laterally proximally mounted toward a forward portion of the trailer and the rear portion being adapted to be laterally distally mounted in respect with the forward portion toward a rear portion of the trailer, the skirt panel defining a curved portion between the front portion and the rear portion when mounted on the trailer in an aerodynamic configuration; and
securing at least one resilient strut between the trailer and the skirt panel, the at least one resilient strut maintaining the skirt panel in an aerodynamic configuration, the at least one resilient strut allowing the skirt panel to bend away from the aerodynamic configuration when contacting a foreign object and to recover its aerodynamic configuration thereafter, *the at least one resilient strut being adapted to sustain an elastic deformation without breaking when the skirt panel bends away from the aerodynamic configuration both proximally toward a center of the trailer and distally away from the center of the trailer, and to self-recover when the skirt panel returns to the aerodynamic configuration*.

16. A resilient skirt assembly kit comprising:
a skirt panel adapted to be disposed on a trailer to aerodynamically route air along the trailer, the skirt panel defining a front portion and a rear portion, the front portion being adapted to be laterally proximally mounted toward a forward portion of the trailer and the rear portion being adapted to be laterally distally mounted in respect with the forward portion toward a rear portion of the trailer, the skirt panel defining a curved portion between the front portion and the rear portion when mounted on the trailer in an aerodynamic configuration; and
a plurality of resilient struts adapted to secure the skirt panel to the trailer, *at least one resilient strut being adapted to sustain an elastic deformation without breaking when the skirt panel bends away from the aerodynamic configuration both proximally toward a center of the trailer and distally away from the center of the trailer, and to self-recover when the skirt panel returns to the aerodynamic configuration*.

*19. The resilient aerodynamic skirt of claim 1, wherein the resilient strut when bending can reach a radius of curvature of about 20 centimeters without going into plastic deformation or breaking.*

*20. The method of claim 13, wherein the at least one resilient strut when bending can reach a radius of curvature of about 20 centimeters without going into plastic deformation or breaking.*

*21. The kit of claim 16, wherein the at least one resilient strut when bending can reach a radius of curvature of about 20 centimeters without going into plastic deformation or breaking.*

*22. A resilient aerodynamic skirt adapted to be substantially longitudinally mounted to a trailer, the resilient aerodynamic skirt comprising a skirt panel defining a front portion and a rear portion, the front portion being adapted to be laterally proximally mounted toward a forward portion of the trailer and the rear portion being adapted to be laterally distally mounted in respect with the forward portion toward a rear portion of the trailer, the skirt panel defining a curved portion between the front portion and the rear portion when mounted on the trailer in an aerodynamic configuration, the skirt panel being adapted to bend away from the aerodynamic configuration when contacting a foreign object and to recover its aerodynamic configuration thereafter, wherein the resilient aerodynamic skirt comprises a resilient strut securing the skirt panel to the trailer, the resilient strut being adapted to bend when the skirt panel bends away from the aerodynamic configuration, and wherein the resilient strut when bending is able to reach a radius of curvature of about 20 centimeters without going into plastic deformation or breaking.*

*23. A method of installing a resilient skirt assembly on a trailer, the method comprising:*
*securing a skirt panel to the trailer, the skirt panel defining a front portion and a rear portion, the front portion being adapted to be laterally proximally mounted toward a forward portion of the trailer and the rear portion being adapted to be laterally distally mounted in respect with the forward portion toward a rear portion of the trailer, the skirt panel defining a curved portion between the front portion and the rear portion when mounted on the trailer in an aerodynamic configuration; and*
*securing at least one resilient strut between the trailer and the skirt panel, the at least one resilient strut maintain-* ing the skirt panel in an aerodynamic configuration, the at least one resilient strut allowing the skirt panel to bend away from the aerodynamic configuration when contacting a foreign object and to recover its aerodynamic configuration thereafter, and the at least one resilient strut when bending being able to reach a radius of curvature of about 20 centimeters without going into plastic deformation or breaking.

24. A resilient skirt assembly kit comprising:

a skirt panel adapted to be disposed on a trailer to aerodynamically route air along the trailer, the skirt panel defining a front portion and a rear portion, the front portion being adapted to be laterally proximally mounted toward a forward portion of the trailer and the rear portion being adapted to be laterally distally mounted in respect with the forward portion toward a rear portion of the trailer, the skirt panel defining a curved portion between the front portion and the rear portion when mounted on the trailer in an aerodynamic configuration; and a plurality of resilient struts adapted to secure the skirt panel to the trailer, at least one resilient strut when bending being able to reach a radius of curvature of about 20 centimeters without going into plastic deformation or breaking.

\* \* \* \* \*